United States Patent [19]
Miyazaki et al.

[11] Patent Number: 5,508,773
[45] Date of Patent: Apr. 16, 1996

[54] FOCAL PLANE SHUTTER FOR USE IN A PHOTOGRAPHIC CAMERA

[75] Inventors: Hiroshi Miyazaki; Kenichi Watabe; Toshihisa Saito, all of Tokyo, Japan

[73] Assignee: Copal Company Limited, Japan

[21] Appl. No.: 341,757

[22] Filed: Nov. 18, 1994

[30] Foreign Application Priority Data

Nov. 22, 1993 [JP] Japan .................. 5-315842

[51] Int. Cl.$^6$ .................................................. G03B 9/40
[52] U.S. Cl. ........................................................ 354/246
[58] Field of Search ................................. 354/246–249

[56] References Cited

U.S. PATENT DOCUMENTS

| | | | |
|---|---|---|---|
| 4,926,202 | 5/1990 | Fukuda et al. | 354/246 |
| 5,159,371 | 10/1992 | Fukuda | 354/246 |
| 5,266,993 | 11/1993 | Uematsu | 354/246 |

FOREIGN PATENT DOCUMENTS

| | | |
|---|---|---|
| 58-16625 | 2/1983 | Japan . |
| 60-221734 | 11/1995 | Japan . |

Primary Examiner—David M. Gray
Attorney, Agent, or Firm—Graham & James

[57] ABSTRACT

A focal plane shutter for use in a photographic camera in which a shutter base plate is made of a synthetic resin material and a metallic supporting plate is mounted on a front surface of the shutter base plate. Shafts pivoting levers for driving a leading blade group and trailing blade group are fixed to a front surface of the metallic supporting plate, whereas shafts pivoting arms for driving the leading blade group and the trailing blade group are fixed to a rear surface of the supporting plate. The shafts pivoting the driving arms and supporting arms protrude from a rear surface of the shutter base plate.

4 Claims, 3 Drawing Sheets

FOCAL PLANE SHUTTER FOR USE IN A PHOTOGRAPHIC CAMERA

BACKGROUND OF THE INVENTION a) Field of the Invention

The present invention relates to a focal plane shutter for use photographic camera in which a shutter base plate is made of a synthetic resin material.

b) Description of the Prior Art

Known as base plates for focal plane shutters are ones which are made of metals and others which are made of synthetic resin materials. As a material for the metallic shutter base plates, it is general to select iron or aluminium which is effective for reducing weights of the focal plate shutters. Further, fixed to the shutter base plates are shafts for rotatably supporting levers to be used for driving shutter blade groups and winding springs therearound. These shafts must be fixed perpendicularly to the shutter base plates and have physical strengths sufficient for withstanding movements of the driving levers. It is therefore desirable that these shafts and the shutter base plates are made of metals.

in these days, however, there are provided focal plane shutters in which shutter base plates are made of synthetic resin materials. The shutter base plates made of the synthetic resin materials have been rapidly adopted owing to their merits that they require low material costs and that they can easily be molded into various forms, but these shutter base plates have physical strengths which are lower than those of the shutter base plates made of metals. For this reason, it is inadequate to fix the above-mentioned shafts to shutter base plate which are simply made of the synthetic resin materials. Under these circumstances, certain proposals have been made to make up for the low physical strength of the shutter base plates made of the synthetic resin materials.

U.S. Pat. No. 4,926,202 and No. 5,159,317 have made proposals to form thick-walled portions within regions to which the above-mentioned shafts are to be fixed. In case of a shutter base plate made of a metal, it is sufficient that such a shaft mounting region has thickness of approximately 0.8 mm even when the shutter base plate is to be used in a focal plane shutter of a high-speed type (having a maximum shutter speed, for example, of $1/4,000$ second). In case of a shutter base plate which is made of an ordinary synthetic resin material and manufactured by an ordinary method, however, the shutter base plate must have thickness of at least 1.4 mm, or exceeding 2 mm in certain cases, when it is to be used in a focal plane shutter having a maximum speed of $1/4,000$ second or lower, except for cases where the shutter base plate is made of an exceptionally expensive material and manufactured by an exceptionally expensive method. Such thickness of the shutter base plate made of the synthetic resin material is extremely disadvantageous for configuring a shutter mechanism so as to have a small size in the back-forth direction (a size as measured in a direction along an optical axis of a photographic lens system for a camera).

Further, when the thick-walled portions of a shutter base plate made of a synthetic resin material are thickened, shrink marks are produced due to large variations of internal plasticities during cooling to be performed immediately after molding, thereby making it remarkably difficult to fix the above-mentioned shafts perpendicularly to the shutter base plate. This applies similarly to a shutter base plate in which the above-mentioned shafts are made of a synthetic resin material and formed integrally with the shutter base plate. This defect will be described below with reference to a example illustrated in FIG. 5.

Shown in FIG. 5 are shafts which protrude from a front surface and a rear surface of a shutter base plate 101: a shaft 101a for rotatably supporting a driving lever 102 for a leading blade group, a shaft 101b for rotatably supporting a driving arm 103, a shaft 101c for rotatably supporting a driving lever 105 for a trailing blade group and a shaft 101d for rotatably supporting a driving arm 106. It is required that the shafts 101a and 101c which protrude from the front surface are coaxial with the shafts 101b and 101d respectively which protrude from the rear surface, or the former two must not be eccentric from the latter two.

When the thick-walled portions are formed in the vicinities of roots of the shafts 101a and 101c for obtaining required strengths of these shafts, however, internal plasticities are largely varied (shrink marks are formed) during the cooling performed immediately after the molding, thereby making it is impossible to perpendicularly fix the shafts 101a, 101b, 101c and 101d, making the shaft 101a eccentric from the shaft 101b, making the shaft 101c eccentric from the shaft 101d, and making it impossible to perform correct exposure by operating the lading blade group and the trailing blade group.

SUMMARY OF THE INVENTION

It is, therefore, an object of the present invention to provide a focal plane shutter which uses a shutter base plate made of a synthetic resin material, and has such a configuration as to permit configuring thin the shutter base plate used to fix supporting shafts for driving levers, driving arms and so on while assuring strength required for the shutter base plate.

Another object of the present invention is to provide a focal plane shutter which uses a shutter base plate made of a synthetic resin material, and has such a configuration as to allow the supporting shafts for the driving levers, the driving arms and so on to be disposed while assuring required strengths and perpendicularity to the shutter base plate.

A still another object of the present invention is to provide a focal plane shutter which uses a shutter base plate made of a synthetic resin material, and has a supporting structure for the driving levers, the driving arms and so on adjustable so as to perform uniform exposure.

The focal plane shutter according to the present invention comprises the shutter base plate made of a synthetic resin material, a metallic supporting plate disposed on a front surface of the shutter base plate, a first shaft and a second shaft which are fixed to the front surface of the shutter base plate, a first driving member and second driving member which are pivoted by the first shaft and the second shaft respectively, and have free ends protruding from a rear surface of the shutter base plate, a third shaft and a fourth shaft which are fixed to a rear surface of the supporting plate coaxially with the first shaft and the second shaft respectively, and protrude from the rear surface of the shutter base plate, a first driving arm and a second driving arm which are pivoted separately to the third shaft and the fourth shaft respectively, and are to be moved by the free ends of the first driving member and the second driving member for operating a leading blade group and a trailing blade group respectively, a fifth shaft and a sixth shaft respectively, and cooperate with the first driving arm and the second driving arm for operating the leading blade group and the trailing blade group.

By selecting the configuration described above, it is possible to secure strength and perpendicularity required for each of the shafts, and obtain total thickness of the shutter base plate and the supporting plate, within a region for fixing the shafts, which is smaller than the conventional total thickness. No problem was involved by prototypes of the focal plane shutter according to the present invention which were manufactured by adopting shutter base plates each 0.5 mm thick and metallic supporting plates each 0.4 mm thick, or total thickness of 0.9 mm.

These and other objects as well as the features and the advantages of the present invention will become apparent from the following detailed description made with reference to the accompanying drawings.

DETAILED DESCRIPTION OF THE PREFERRED EMBODIMENTS

Figure 1:
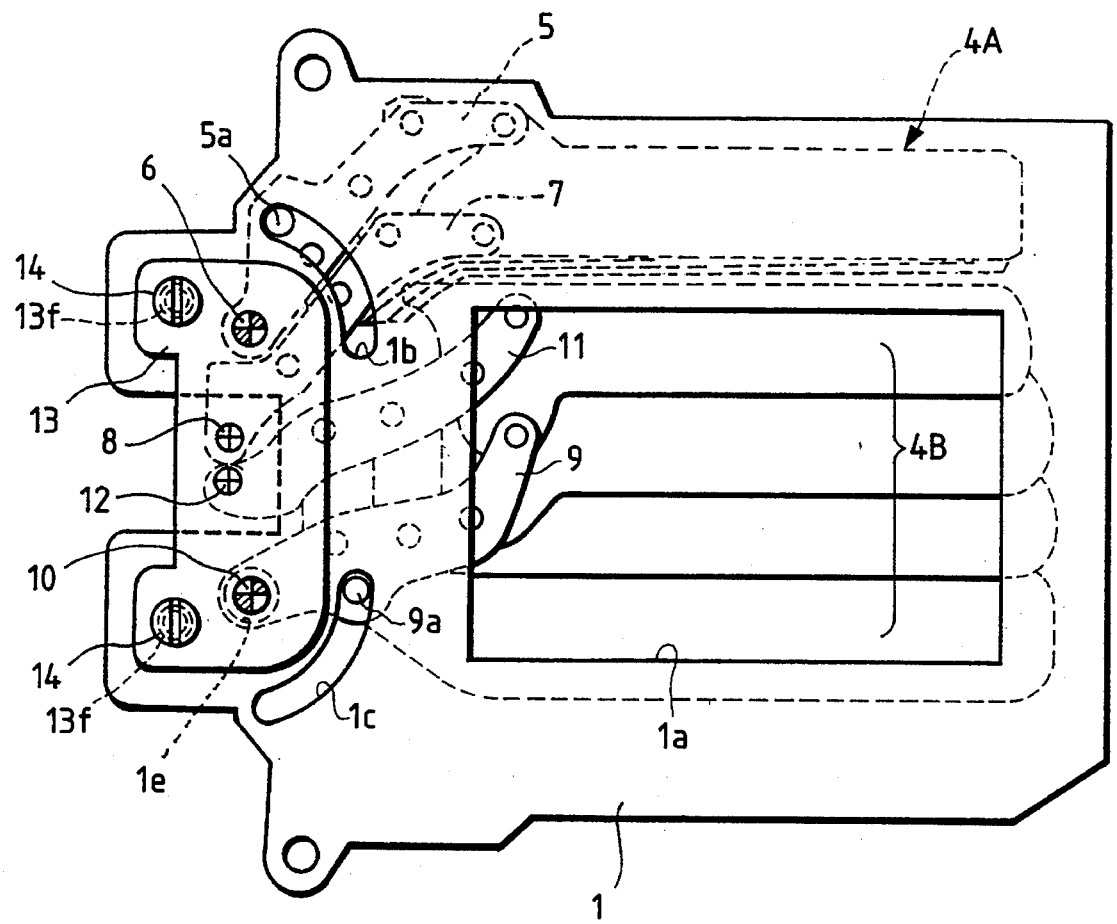
FIG. 1 is a plan view illustrating a configuration of a first embodiment of the focal plane shutter according to the present invention.

Now, the focal plane shutter according to the present invention will be described more detailedly below with reference to the preferred embodiments thereof illustrated in the accompanying drawings. First, a first embodiment of the present invention will be explained with reference to FIGS. 1 and 2. Formed in a shutter base plate 1 made of a synthetic resin material are an exposure aperture 1a and slots 1b, 1c. The slots 1b and 1c have an arc-like shape which is matched with operating regions of driving pins 2a and 3a which are disposed on driving levers 2 and 3 respectively (not shown in FIG. 1). A leading blade group 4A consists of four light-shielding thin sheets which are overlapped, in FIG. 1, with a rear surface of the shutter base plate 1. A trailing blade group consists also of four light-shielding thin sheets which are spread From one another to close the aperture 1a in FIG. 1.

At the rear of the shutter base plate 1, a driving arm 5 is rotatably supported by an axial portion 6a of a metallic shaft 6. The driving arm 5 has a hole 5a in which the driving pin 2a of the driving lever 2 is fitted after it has passed through the slot A supporting arm 7 is rotatably supported by a metallic shaft 8 at the rear of the shutter base plate 1. The driving arm 5 and the supporting arm 7 compose a parallel link mechanism which supports the leading blade group 4A. Accordingly, the leading blade group 4A is spread so as to cover the aperture 1a when the driving arm 5 is rotated clockwise by the driving lever 2 in FIG. 1.

At the rear of the shutter base plate 1, a driving arm 9 for the trailing blade group LB is rotatably supported by an axial portion 10a of a metallic shaft 10. The driving arm 9 has a hole 9a in which the driving pin 3a of the driving lever 3 is fitted after it has passed through the slot 1c. A supporting arm 11 for the trailing blade group 4B is rotatably supported by a metallic shaft 12 also at the rear of the shutter base plate 1. The driving arm 9 and the supporting arm 11 compose a parallel link mechanism which supports the trailing blade group 4B. Accordingly, the trailing blade group 4B opens the aperture 1a and is folded at a location below the aperture 1a when the driving arm 9 is rotated clockwise in FIG. 1 by the driving lever 3.

The shafts 6, 8, 10 and 12 described above are fixed to a metallic supporting plate 13. The driving levers 2 and 3 are pivoted to axial portions 6b and 10b respectively which are disposed on the front surface of the supporting plate 13. At the rear of the supporting plate 13, the shaft 6 is fitted in a hole 1d so that the axial portion 6a thereof protrudes from the rear surface of the shutter base plate 1. The shaft 10 is loosely fitted in a hole 1e so that the axial portion 10a thereof protrudes from the rear surface of the shutter base plate 1. Two screws 14 run through holes 13f formed in the supporting plate 13 and are screwed into the shutter base plate 1.

Now, description will be made of procedures to mount the supporting plate 13 on the shutter base plate 1. First, the shaft 6 and the shaft 10 are inserted into the hole 1d and the hole 1e respectively. Then, positional adjustment of the supporting plate 13 relative to the shutter base plate 1 is performed by turning the supporting plate 13 together with the shaft 6 and the supporting plate 13 is fixed to the shutter base plate 1 by tightening the screws 12. The positional adjustment of the supporting plate 13 serves also as a positional adjustment of the leading blade group 4A relative to the aperture 1a. This positional adjustment of the leading blade group 4A provides an effect to uniformalize exposure between a right side region and a left side region of the aperture 1a.

Figure 2:
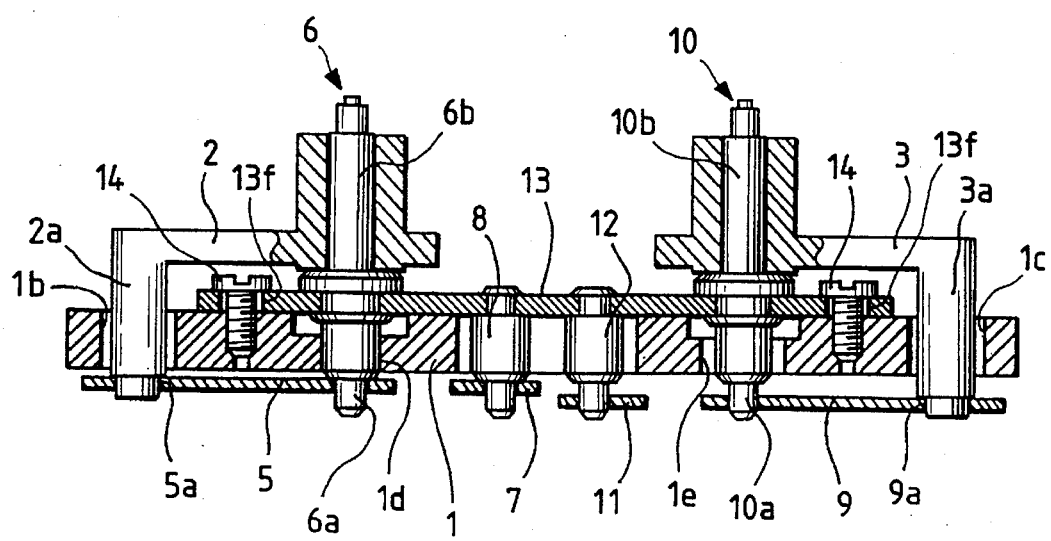
FIG. 2 is a sectional view illustrating the configuration of the first embodiment of the present invention.

Though the hole 1e for the shaft 10 is enlarged for the positional adjustment described above in the first embodiment, it is possible to enlarge the hole 1d for the shaft 6. Further, though the supporting plate 13 is mounted on the front surface of the shutter base plate 1 as shown in FIG. 2 in the first embodiment, the supporting plate 13 may be attached, dependently on configurations of the focal plane shutter, to the rear surface of the shutter base plate 1.

As understood from the foregoing description, the first embodiment of the present invention provides effects that the shafts 6 and 8 can be maintained perpendicular to the shutter base plate 1, that the supporting plate 13 can be thin since it is made of a metal and has a sufficient physical strength, and that the shutter base plate 1 need not be thick.

Figure 3:
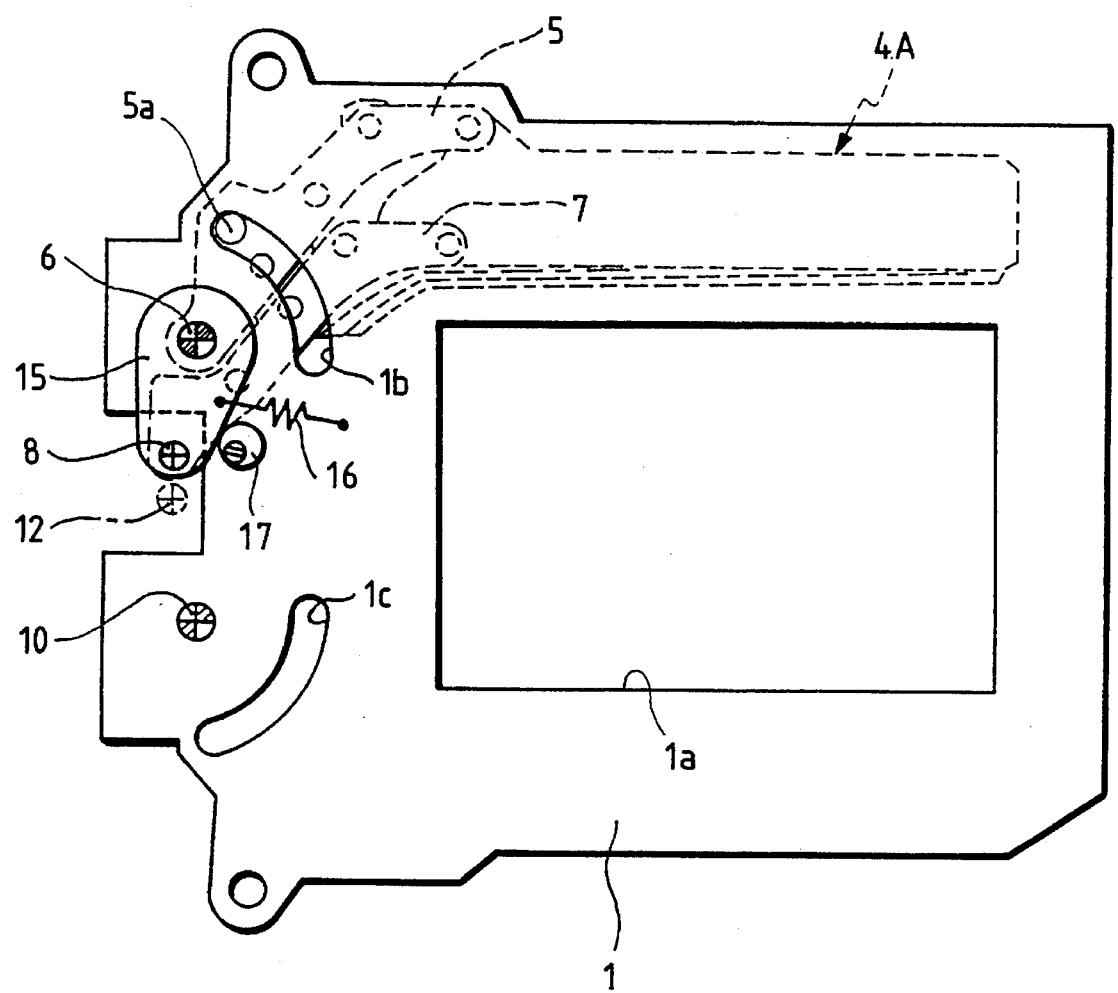
FIG. 3 is a plan view illustrating a configuration of a second embodiment of the focal plane shutter according to the present invention.

Then, a second embodiment of the focal plane shutter according to the present invention will be described with reference to FIGS. 3 and 2. In the second embodiment, the supporting plate 13 used in the first embodiment is divided into two independent plates for a leading blade group and a trailing blade group respectively. Parts of the second embodiments which are common to the first embodiment will be represented by the same numerals and not described in particular. A supporting plate 15 for a leading blade group 4A fixes shafts 6 and 8. The supporting plate 15 is rotatable together with the shaft 6 relatively to a shutter base plate 1 and urged by a spring 16 so as to be rotated counterclockwise. Rotatably mounted on the shutter base plate 1 is an eccentric shaft 17 which has a circumferential surface kept in contact with a side surface of a supporting plate 15. In addition, a supporting plate, a spring and an eccentric shaft are disposed also for a trailing blade group 4B, but not shown in FIGS. 3 and 2.

Figure 4:
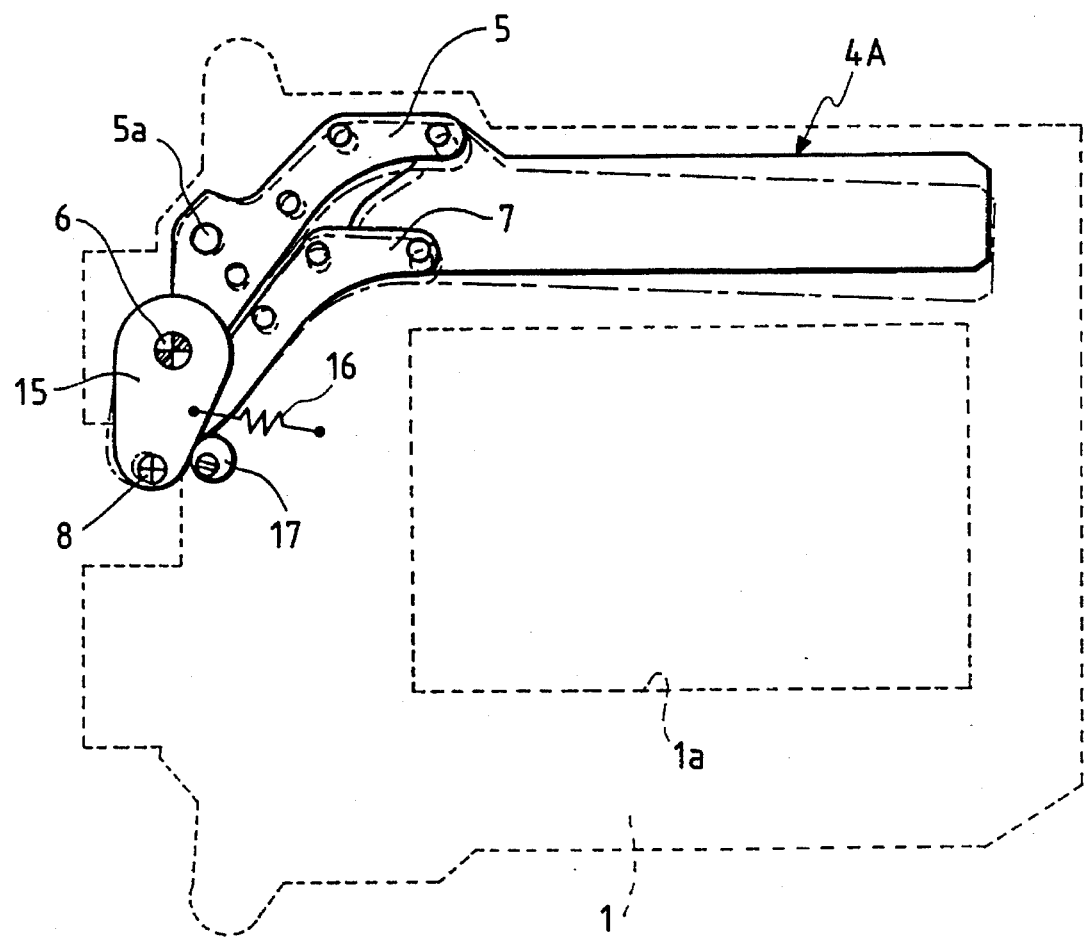
FIG. 4 is a sectional view illustrating the configuration of the second embodiment of the present invention.
Figure 5:
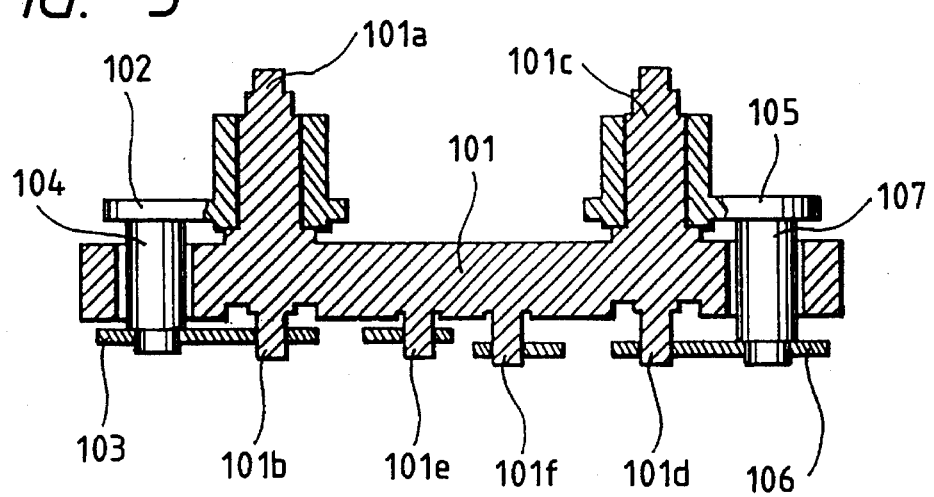
FIG. 5 is a sectional view illustrating a configuration of an example of conventional focal plane shutters.

Positional adjustment of the supporting plate 15 is performed by turning the eccentric shaft 17. When the eccentric shaft 17 is turned, the supporting plate 15 is rotated clockwise or counterclockwise together with the shaft 6. When the shaft 17 is turned counterclockwise in the condition shown in FIG. 3, for example, the supporting plate 15 is pushed by the eccentric shaft 17 and rotated clockwise. Accordingly, the leading blade group 4A is set at a position inclined so as to bring tips of the blades near an aperture 1a as indicated by chain lines in FIG. 4. By turning the eccentric shaft 17 as described above, the leading blade group 4A can be adjusted so as to be set at a position which is optimum relative to the aperture 1a. The trailing blade group 4B can be adjusted similarly by using the supporting plate, etc. which are not shown in FIGS. 3 and 4.

As seen from the description given above, the second embodiment of the present invention also provides effects that the shafts 6 and 8 can be maintained perpendicular to the shutter base plate 1, that the supporting plate 15 may be thin since it is made of a metal and has a sufficient physical strength, and that the shutter base plate 1 need not be thick. Further, the second embodiment permits adjusting the leading blade group and the trailing blade group separately, thereby making it possible about zero a difference in exposure between a right side region and a left side region of the aperture 1a so as to obtain a uniform exposure distribution by changing inclinations of the leading blade group and the trailing blade group relative to the aperture 1a. In addition, it is possible to modify the second embodiment of the present invention so as to use a supporting plate only for either of the leading blade group 4A and the trailing blade group 4B.

What is claimed is:

1. A focal plane shutter for use in a photographic camera comprising:

a shutter base plate made of a synthetic resin material, a metallic supporting plate mounted on a front surface of said shutter base plate, a first shaft and a second shaft fixed to a front surface of said supporting plate, a first driving member and a second driving member pivoted separately to said first shaft and said second shaft respectively, and having free ends protruding from a rear surface of said shutter base plate, a third shaft and a fourth shaft fixed to a rear surface of said supporting plate coaxially with said first shaft and said second shaft respectively, and protruding from the rear surface of said shutter base plate wherein at least one of said third shaft and said fourth shaft is loosely fitted in a hole formed in said shutter base plate, a first driving arm and a second driving arm pivoted separately to said third shaft and said fourth shaft respectively, and moved by the free ends of said first driving member and said second driving member respectively for operating a leading blade group and a trailing blade group respectively, a fifth shaft and a sixth shaft fixed to the rear surface of said supporting plate and protruding from the rear surface of said shutter base plate, and a first supporting arm and a second supporting arm pivoted separately to said fifth shaft and said sixth shaft respectively, and cooperating with said first driving arm and said second driving arm respectively for operating said leading blade group and said trailing blade group.

2. A focal plane shutter for use in a photographic camera comprising:

a shutter base plate made of a synthetic resin material, a metallic supporting plate mounted on a front surface of said shutter base plate, said metallic supporting plate being composed of a first supporting plate and a second supporting plate, a first shaft fixed to a front surface of said first supporting plate, a second shaft fixed to a front surface of said second supporting plate, a first driving member and a second driving member pivoted separately to said first shaft and said second shaft respectively, and having free ends protruding from a rear surface of said shutter base plate, a third shaft fixed to a rear surface of said first supporting plate coaxially with said first shaft, and protruding from the rear surface of said shutter base plate, a fourth shaft fixed to a rear surface of said second supporting plate coaxially with said second shaft, and protruding from the rear surface of said shutter base plate, a first driving arm and a second driving arm pivoted separately to said third shaft and said fourth shaft respectively, and moved by the free ends of said first driving member and said second driving member respectively for operating a leading blade group and a trailing blade group respectively, a fifth shaft fixed to the rear surface of said first supporting plate and protruding from the rear surface of said shutter base plate, a sixth shaft fixed to the rear surface of said second supporting plate and protruding from the rear surface of said shutter base plate, and a first supporting arm and a second supporting arm pivoted separately to said fifth shaft and said sixth shaft respectively, and cooperating with said first driving arm and said second driving arm respectively for operating said leading blade group and said trailing blade group.

3. A focal plane shutter for use in a photographic camera according to claim 2 wherein at least either of said first supporting plate and said second supporting plate is rotatably mounted on said shutter base plate.

4. A focal plane shutter for use in a photographic camera according to claim 3 wherein at least either of said first supporting plate and said second supporting plate is rotatably by an eccentric shaft.

* * * * *